Patented Dec. 6, 1938

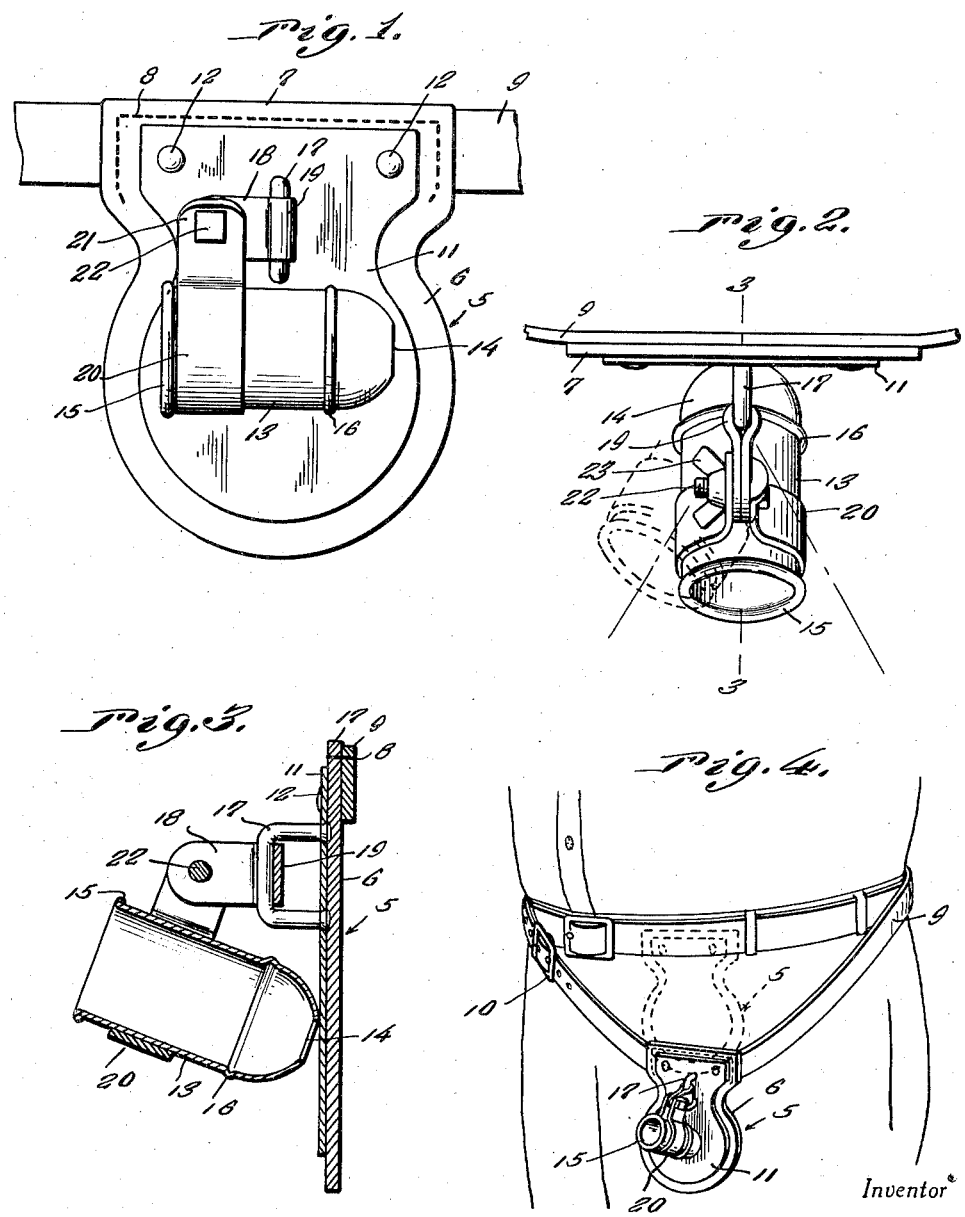

2,139,188

UNITED STATES PATENT OFFICE 2,139,188

FOLDABLE FISHING POLE HOLDER

Albert S. Haislip, Fredericksburg, Va.

Application June 7, 1937, Serial No. 146,920

2 Claims. (Cl. 224—5)

The present invention relates to an improved strap supported stirrup-type fishing pole or rod holder for use by anglers and fishermen.

In order to specifically classify the subject matter of the invention in contrast to the prior art to which it relates, it is helpful to note that we are here concerned with certain refinements and appreciable distinctions having companion relationship to the invention disclosed and claimed in Patent 2,068,054, granted to me under date of January 19, 1937.

Briefly, the gist of the invention covered in the aforementioned patent relates to what was called a belt-type fishing rod holder, the same being characterized by a pole or rod thrust reception and body shield equipped with a pole accommodation socket having one end in constant movable contact and thrust relation with respect to the shield when in normal use, and means for slidably and pivotally attaching the socket or cup to the attachment shield.

After due deliberation and consideration of the subject matter of the patent, it has been found expedient and practicable to resort to certain needy improvements. By contrast, therefore, it will be observed that in the instant case instead of adjustably attaching the shield to the conventional trousers belt, a body-encircling strap has been provided, the purpose of this being to make the complete accessory self-contained and wholly operative without the aid of the customary belt. Then, too, under this improved idea the position of the shield can be raised or lowered to accommodate short and long handled poles and rods, whereby to permit convenient access to be had to the hand controlled reel.

The cardinal improvement, however, is directed toward the adoption and use of means for allowing the cup or socket to be folded into intimate contact with the shield with a view toward promoting greater compactness and convenience.

Other and more specific features and advantages will become evident from the succeeding description and drawing.

In the drawing:

Figure 1 is what may be called a fragmentary front elevation of the improved construction disclosing the method of mounting and folding the handle accommodation cup or socket.

Figure 2 is a top plan view of the arrangement seen in Figure 1 showing the cup in its normal rockable and tiltable position for use.

Figure 3 is a vertical sectional view taken approximately on the plane of the line 3—3 of Figure 2.

Figure 4 is a perspective view showing the invention as used, particularly for surf fishing.

The shield unit is denoted in the drawing by the numeral 5. This is characterized by a pad of heavy leather or equivalent material including a disk-like body portion 6 and an attaching tab 7, which tab is stitched or otherwise connected as at 8 to the body encircling strap 9. As disclosed in Figure 4, instead of using the usual belt for supporting the shield 5, it is carried by a hanger or suspension strap, this being adjustably mounted as indicated at 10 to permit the shield to be disposed at the proper elevation in relation to the body to accommodate short and long handled poles. The numeral 11 designates a polished metal socket tracking and wear plate super-imposed on the leather backing or pad 6 and riveted or otherwise secured in place as at 12. This provides a convenient and suitable thrust base for the metal cup or socket 13. Incidentally, this cup is identical with the one shown in the aforementioned patent and has a part-spherical bottom apertured at 14 for drainage. At its outer end is an annular retention and stop bead 15 spaced longitudinally from a companion bead 16.

The numeral 17 designates a fixedly mounted U-shaped staple carried by the upper portion of the plate 11 to accommodate a hinging leaf 18, said leaf being formed with a hinge knuckle 19 pivotally adjoined to the bight portion of said attaching staple 17. The hanger and adjusting stirrup or clamp is denoted by the numeral 20, and this embraces the cup 13 between the beads 15 and 16. This is in the nature of a split band and the parallel end portions thereof indicated at 21 straddle the attaching and hinge forming leaf 18, being adjustably and pivotally bolted thereto as indicated at 22. Incidentally, the bolt is provided with a thumb nut, as shown to advantage in Figure 2, said nut being denoted by the numeral 23.

It is evident that the beads 15 and 16 coacting with the swingable cradle-like clamp 20 allow the cup to be adjusted in and out with respect to said clamp, as evident from Figure 3. This varies the inclination of the cup with respect to the substantially perpendicular shield unit 5. Then, too, these beads prevent accidental endwise displacement by limiting the sliding movement of the cup in the clamp in opposite directions.

In practice it is understood that the butt or inner end of the socket rests in constant movable contact against the shield, as brought out to advantage in Figures 2, 3, and 4. Naturally, under certain fishing conditions there is considerable endwise thrust of the pole against the body which promotes great discomfort. This is, however, offset by incorporating in the structure the backing plate 11 and the associated leather pad 6, which features coordinate collectively to overcome discomfort.

Instead of attaching the device to the body encircling belt, it is carried by the body encircling strap 9 and thus we have a pendulous clamp and attaching strap and associated pole socket of a self-adapting type to accommodate successful manipulation and handling of the pole.

Normally, as is evident, the thumb nut 23 may be loosened sufficiently to allow full play of the cup in relation to the shield. This gives the desired cradling and adjustable action. While the pole is held in normal inclined fishing position, as shown in Figures 2 and 3, the cup rests against the shield in an approximate acute angular position. It can, however, be turned to a substantially right angular position when the pole is held, as in surf fishing, at an approximate right angle with respect to the body. This loose pendulous and cradle action for the cup also allows the butt end to rest in movable contact with the shield, this being advantageous in that as the fish is pulled in close to the boat, the pole must necessarily be lowered to an inclination below the horizontal. As it is gradually lowered, the rounded butt of the socket slides up gradually in riding or cam contact with the plate 11. At the same time it feeds out through the saddling clamp 20 until it gradually swings almost completely through it to occupy the pole accommodating position at that time. This compensating and self-adapting phase of the invention is highly important in that it prevents the socket from being punched into the side or abdomen of the user. Hence, it relieves undue pressure and is highly satisfactory in all respects.

The outstanding point to be remembered by comparison with the aforementioned patent is the addition of the features 17 and 18. These, in conjunction with the pivot 22, provide not only the pendulous attachment for the cup, but allow the cup to be turned into a horizontal folded position and to be collapsed in against the shield for compactness and convenience.

It is evident that the features 17, 18, 20, and 22 cooperate collectively in forming what may be described in general terms as a universal joint for the socket or cup 13. It follows, therefore, that when said cup is in the position illustrated in Figures 3 and 4, it may rock from side to side while in contact with the thrust plate 11. Or, it may be bodily lifted clear of contact with said plate by swinging said cup and its clamping band 20 outwardly and away from the plate on the horizontal axis 22. Moreover, we have found in this arrangement a vertical swinging axis between the hinge leaf member 18 and the bracket 17, this allowing said member 18 to swing in a horizontal plane on a vertical axis. The axis 22 is at right angles and horizontal to said vertical axis allowing the independent swing of the clamping band 20 and cup 13. Furthermore, the cup can be slid to and held in any adjusted position in the cradle-like band or clamp 20. That is to say, it can be positioned, for example, as shown in Figure 1, or as in Figure 3, or at any point between the beads 15 and 16. This makes it possible to properly angle the cup for varying tilted positions of the fishing pole or rod. It is further to be noted that by tightening the thumb nut 23, the band 20 encircles the cup rigidly and momentarily becomes a rigid part thereof, whereby to join the cup 13, band 20, and pivot bolt 22 to the swingable hinge leaf 18. This makes the cup readily lockable as well as releasable and adapted to ever changing conditions encountered by the user.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention may be resorted to if desired.

I claim:

1. In a foldable fishing pole holder of the class described, an end thrust reception body shield having means for attaching it to the body of the wearer, said shield including a smooth surfaced plate, a hinging leaf swingable in a horizontal plane by being pivotally attached to said plate for pivotal movement on a vertical axis, a rod receiving and holding cup having its inner end rounded and in rockable and movable contact with said plate, carrier means in which said cup is slidably mounted, said carrier means being swingable toward and from the plate, to permit bodily movement of the holding cup, by means of a horizontal pivotal connection between the carrier means and said leaf.

2. In a foldable fishing pole holder of the class described, an end thrust body shield, means for maintaining the shield in useful position on the body of the wearer, a cradle-like carrier clamp, a fishing pole accommodation socket slidably and rotatably saddled in said carrier clamp, the inner end of said socket being of part-spherical formation to rest, when in use, in readily movable anti-friction contact with the adjacent face of said shield, and connecting means between said carrier clamp and shield, said connecting means being swingable in a horizontal plane being attached by a vertical pivot to the shield, and said carrier clamp being attached to said connecting means by a horizontal pivot.

ALBERT S. HAISLIP.